(12) United States Patent
Chen et al.

(10) Patent No.: US 11,038,446 B2
(45) Date of Patent: Jun. 15, 2021

(54) MOTOR DRIVING CIRCUIT

(71) Applicant: ANPEC ELECTRONICS CORPORATION, Hsinchu (TW)

(72) Inventors: Kun-Min Chen, Hsinchu (TW); Shen-Min Lo, New Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 127 days.

(21) Appl. No.: 16/108,367

(22) Filed: Aug. 22, 2018

(65) Prior Publication Data
US 2019/0356250 A1 Nov. 21, 2019

(30) Foreign Application Priority Data

May 18, 2018 (TW) .................................. 107117004

(51) Int. Cl.
*H02P 6/18* (2016.01)
*G01D 5/20* (2006.01)
*H02P 29/024* (2016.01)

(52) U.S. Cl.
CPC ............... *H02P 6/18* (2013.01); *G01D 5/208* (2013.01); *H02P 29/0241* (2016.02)

(58) Field of Classification Search
USPC .................................................... 318/400.38
See application file for complete search history.

(56) References Cited

U.S. PATENT DOCUMENTS

| 6,738,940 B1* | 5/2004 | Hummel | G01R 31/3167 714/728 |
| 2005/0045879 A1* | 3/2005 | Ausserlechner | H01L 23/562 257/48 |
| 2008/0258716 A1* | 10/2008 | Hinz | G01D 5/145 324/207.21 |
| 2009/0033324 A1* | 2/2009 | Tomida | G01R 33/07 324/260 |
| 2014/0292247 A1* | 10/2014 | Ng | H02P 29/00 318/558 |
| 2015/0185279 A1* | 7/2015 | Milano | G01R 33/09 324/750.3 |
| 2016/0139229 A1* | 5/2016 | Petrie | H03M 1/34 324/202 |

FOREIGN PATENT DOCUMENTS

| CN | 106664043 A | 5/2017 |
| TW | 201316674 A1 | 4/2013 |

* cited by examiner

*Primary Examiner* — Jorge L Carrasquillo
(74) *Attorney, Agent, or Firm* — Li & Cai Intellectual Property (USA) Office

(57) ABSTRACT

A motor driving circuit includes a plurality of pins, a Hall sensor, a Hall signal processing portion and a driving processing circuit. The test-starting pin for receiving the test-starting signal and the test signal output pin for outputting the test signal are shared with at least one pin of the plurality of pins. The Hall sensor senses the change in the magnetic field of the motor to generate a Hall signal. The Hall signal processing unit amplifies the generated Hall signal, and the driving processing circuit drives the motor based on an output signal of the Hall signal processing unit and a control signal input from one of the plurality of pins. In a test mode, the output signal is output from the test signal output pin as a test signal. In a normal mode, at least one pin is used for normal operation.

3 Claims, 4 Drawing Sheets

MOTOR DRIVING CIRCUIT

CROSS-REFERENCE TO RELATED PATENT APPLICATION

This application claims the benefit of priority to Taiwan Patent Application No. 107117004, filed on May 18, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit, and more particularly to a motor driving circuit capable of testing a Hall sensor using existing pins.

BACKGROUND OF THE DISCLOSURE

In many architectures of motor controllers, the communication interface commonly used for external communication, such as $I^2C$, SPI, SMBUS, etc., which requires at least two transmission lines, one for transmitting data signal and another one for transmission clock signal. The number of pins can vary depending on the number of driving phases of the motor. Plural pins can be used to receive pulse width modulation (PWM) control signals associated to motor speed control, and generate output signals according to the received signals for providing to the driving circuit for operation and control.

Generally, since the motor drive circuit of the built-in Hall sensor is not able to measure the signal of the internal Hall sensor, when the motor is cooperated with the motor driving circuit, it is unable to determine whether the magnetic field actually sensed is strong enough. Since the sensed magnetic field is mainly affected by the magnetization of the rotor and the distance from the Hall sensor to the rotor, if the magnetic field sensed by the Hall sensor is not large enough, there is a chance that the motors manufactured in mass production will not run smoothly.

On the other hand, when making a single IC chip, the number of pins will directly affect the cost of the package, so that the reduction of the number of the pins is necessary. Therefore, in order to overcome the above-mentioned defects, providing a testing mechanism under a limited number of the pins by improving the circuit design has become an important issue in the art.

SUMMARY OF THE DISCLOSURE

One object of the present disclosure is to provide a motor driving circuit for driving a motor, and the motor driving circuit includes a plurality of pins, a Hall sensor, a Hall signal processing unit and a driving processing circuit. In the plurality of pins, a test-starting pin for receiving a test-starting signal and a test signal output pin for outputting a test signal are shared with at least one of the plurality of pins. The Hall sensor is configured to sense a change in a magnetic field of the motor to generate a Hall signal accordingly. The Hall signal processing unit is coupled to the Hall sensor and is configured to amplify the generated Hall signal. The driving processing circuit is configured to drive the motor according to an output signal of the Hall signal processing unit and a control signal input by one of the plurality of pins. The Hall signal processing unit includes an amplifier circuit for amplifying the Hall signal and a comparator circuit for comparing the Hall signal to generate the output signal. The driving processing circuit is configured to enter a test mode when receiving the test-starting signal, and output an output signal of the Hall signal processing unit to the test signal output pin as the test signal. In a normal mode, the at least one pin is used for normal operation.

Preferably, the driving processing circuit includes a driving circuit, a driving pulse width modulation (PWM) signal generating unit and a selection circuit. The driving PWM signal generating unit is coupled to the driving circuit, and the selection circuit is coupled to the driving PWM signal generating unit, the amplifier circuit and the at least one pin, In the normal mode, the PWM driving signal generating unit receives a PWM signal from a PWM pin among the plurality of pins through the selection circuit, the driving circuit is configured to receive the output signal and the driving PWM signal, and to drive the motor according to the output signal and the driving PWM signal. The selection circuit enters a test mode when the test-starting signal is received by the PWM pin, and the selection circuit is configured to selectively generate a first signal path between the amplifier circuit and the PWM pin to output the amplified Hall signal as the test signal.

Preferably, the driving processing circuit includes a driving pulse width modulation (PWM) signal generating unit. The driving PWM signal generating unit is coupled to the driving circuit, the amplifier circuit and an $I^2C$ interface. In the normal mode, the PWM driving signal generating unit is configured to receive a PWM signal from a serial clock signal pin among the plurality of pins through the $I^2C$ interface, and to generate a PWM driving signal according to the PWM signal, the driving circuit is configured to receive the output signal and the driving PWM signal, and to drive the motor according to the output signal and the driving PWM signal. The selection circuit enters the test mode when receiving the test signal from the PWM pin, and the driving PWM signal generating unit is configured to output the test signal from the serial data signal pin among the plurality of pins through the $I^2C$ interface according to the received Hall signal.

One of the advantages of the present disclosure is that the motor driving circuit provided by the present disclosure may test the operation status of the Hall sensor with the limited number of pins through the technical features of "a test-starting pin for receiving a test-starting signal and a test signal output pin for outputting a test signal are shared with at least one of the plurality of pins", thereby ensuring that the motors manufactured in mass production run smoothly, and saving package costs by implementing the motor driving circuit with the existing pins.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
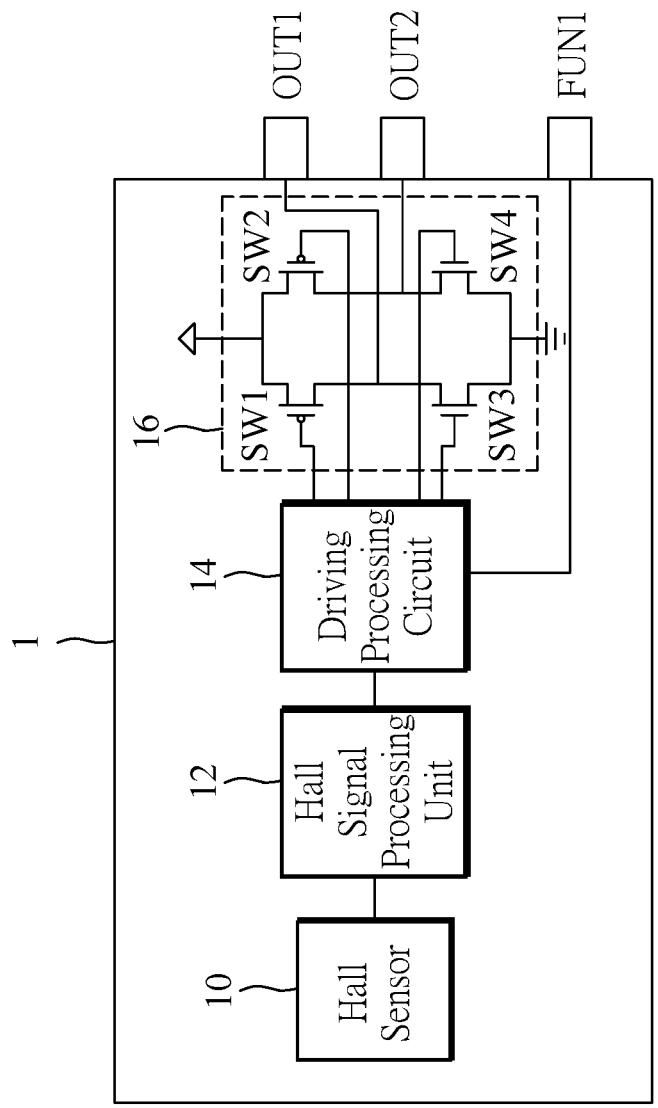
FIG. 1 is a circuit schematic diagram of a motor driving circuit of a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the present disclosure relating to the "motor driving circuit" are described by way of specific embodiments, and those skilled in the art can understand the advantages and effects of the present disclosure from the disclosure of the present specification. The invention can be implemented or applied in various other specific embodiments, and various modifications and changes can be made without departing from the spirit and scope of the invention. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, the term "or" as used herein may include a combination of any one or more of the associated listed items, depending on the actual situation.

First Embodiment

Reference is now made to FIG. 1, which is a circuit schematic diagram of a motor driving circuit of a first embodiment of the present disclosure. As shown, a first embodiment of the present disclosure provides a motor driving circuit 1 for driving a motor, including a Hall sensor 10, a Hall signal processing unit 12, and a driving processing circuit 14. In this architecture, the motor driving circuit 1 can include a plurality of pins, such as the first output terminal OUT1, the second output terminal OUT2, and the function pin FUN1 shown in FIG. 1. The test-starting pin for receiving the test-starting signal and the test signal output pin for outputting the test signal share a pin with the function pin FUN1. For exemplary purposes, the number of the function pin FUN1 shown in FIG. 1 is one, but is not limited thereto.

Next, the Hall sensor 10 can be disposed adjacent to the motor for sensing changes in the magnetic field of the motor, and for determining the position of a single magnetic pole to generate a Hall signal accordingly.

The Hall signal processing unit 12 is coupled to the Hall sensor 10 and configured to amplify the generated Hall signal. The Hall signal processing unit 12 may receive two sets of Hall signals and accordingly detect the timing of switching the driving phases. For example, the Hall signal detecting circuit 12 may further include a comparator for comparing the Hall signals, and outputting the output signal of the comparator as a signal indicating the timing of switching the driving phases. Alternatively, the Hall signal detection 12 may also include an amplifier that amplifies the Hall signal or a differential pair of Hall signals.

The driving processing circuit 14 may drive the motor according to the output signal of the Hall signal processing unit and a control signal input from one of a plurality of pins, for example, the function pin FUN1. The motor driving circuit 1 further includes a full bridge circuit 16 which may be included in the drive processing circuit 14 or independently provided. The full bridge circuit 16 has a first switch SW1, a second switch SW2, a third switch SW3 and a fourth switch SW4. The first switch SW1 is coupled between the driving processing circuit 14 and the first output terminal OUT1, the second switch SW2 is coupled between the input end of the drive processing circuit 14 and the second output terminal OUT2, the third switch SW3 is coupled between the first output terminal OUT1 and the ground terminal, and the fourth switch SW4 is coupled between the second output terminal OUT2 and the ground terminal.

In general, the driving processing circuit 14 can receive the test-starting signal via the function pin FUN1 and enter the test mode. In the test mode, the driving processing circuit 14 may use the function pin FUN1 as the test signal output pin and output the output signal of the Hall signal processing unit 12 as the test signal. In the normal mode, the function pin FUN1 may be used for normal operation. For example, in the normal operation, the driving processing circuit 14 may drive the motor according to the output signal of the Hall signal processing unit and the control signal input from the function pin FUN1.

Therefore, with the above configuration, the operation status of the Hall sensor may be tested with the limited number of pins, thereby ensuring that motors manufactured in mass production run smoothly, and saving package costs by implementing the motor driving circuit with the existing pins.

This embodiment is merely illustrative of the core concept of the present disclosure, which will be described in more detail in the following embodiments in accordance with the accompanying drawings.

Second Embodiment

Figure 2:
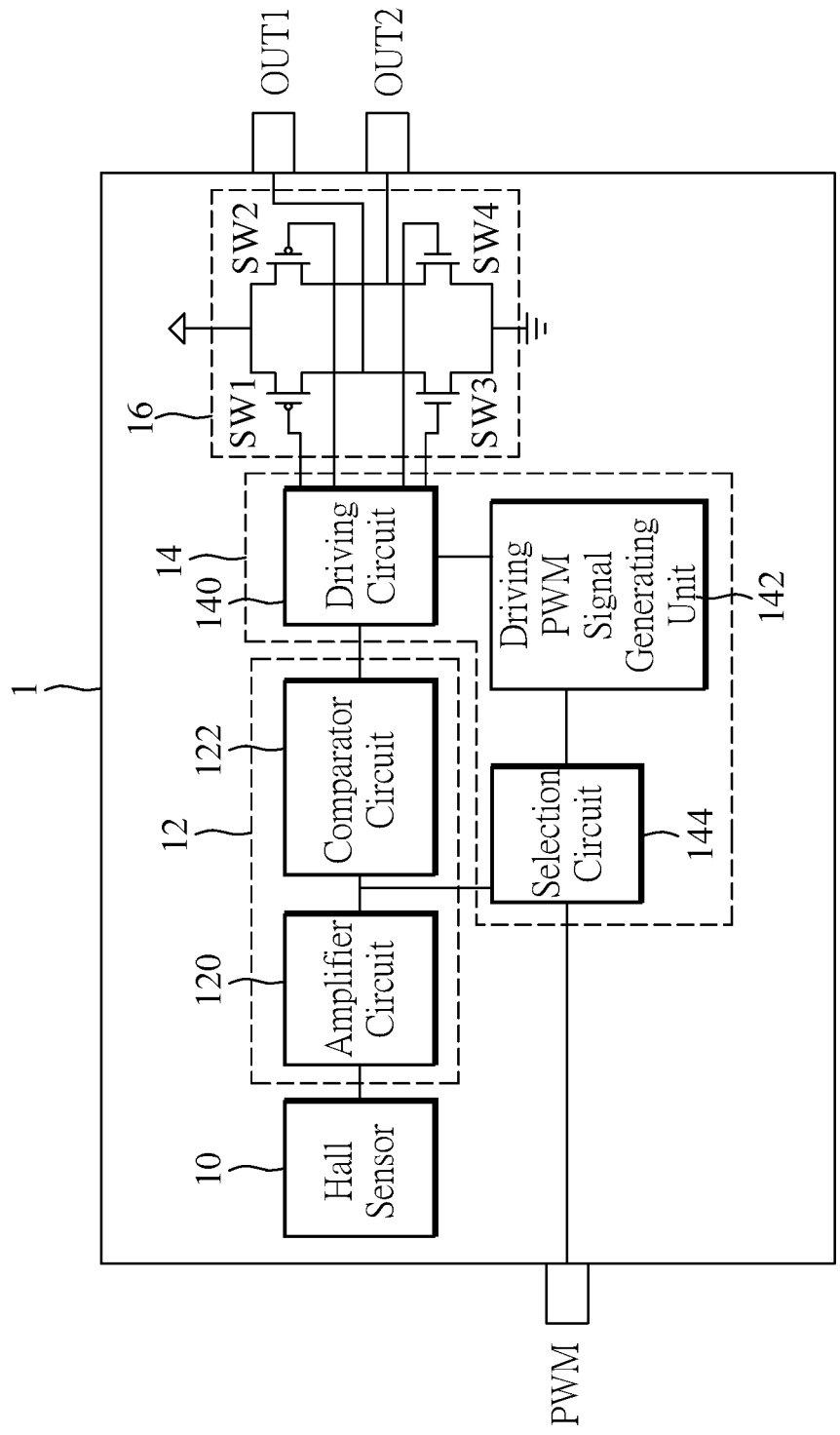
FIG. 2 is a circuit schematic diagram of a motor driving circuit of a second embodiment of the present disclosure.

Reference is now made to FIG. 2, which is a circuit schematic diagram of a motor driving circuit of a second embodiment of the present disclosure. As shown, a second embodiment of the present disclosure provides a motor driving circuit 1 for driving a motor, including a Hall sensor 10, a Hall signal processing unit 12, and a driving processing circuit 14. In the present embodiment, like elements are denoted by like reference numerals, and thus repeated descriptions are omitted.

Specifically, the Hall signal processing unit 12 may further include an amplifier circuit 120 and a comparator circuit 122. The amplifier circuit 120 can be used to amplify the Hall signal, and the comparator circuit may be used to compare the Hall signals to generate an output signal.

For example, a Hall signal processing unit 12 may receive two sets of Hall signals, the amplifier circuit 120 amplifies two sets of Hall signals, the comparator circuit 122 may compare the pair of the two sets of Hall signals, or respectively compare the two sets of Hall signals with the reference voltage, to detect the timing of switching the drive phase.

On the other hand, in the present embodiment, the driving processing circuit 14 further includes a drive circuit 140, a driving PWM signal generating portion 142, and a selection circuit 144. The driving PWM signal generating unit 142 is coupled to the driving circuit 140, and the selection circuit 144 is coupled to the driving PWM signal generating unit 141, the amplifier circuit 120, and the PWM pin PWM.

The selection circuit 144 can be, for example, a multiplexer. In the normal mode, the driving PWM signal generating unit 142 receives the PWM signal from the PWM pin PWM through the selection circuit 144, and generates the driving PWM signal according to the PWM signal. After the driving circuit 140 receives the output signal and the driving PWM signal, the motor may be driven according to the output signal generated by the comparator circuit 122 and the driving PWM signal. By utilizing the externally input PWM signal, the overall average voltage value is increased or decreased by changing the duty cycle, thereby providing intermittently switched voltage and power to control characteristics such as motor speed and the like.

In this architecture, the motor driving circuit 1 can include a plurality of pins, such as the first output terminal OUT1, the second output terminal OUT2, and the PWM pin PWM shown in FIG. 2. The test-starting pin for receiving the test-starting signal and the test signal output pin for outputting the test signal is shared with the PWM pin PWM.

In detail, the selection circuit 144 can receive the test-starting signal from the PWM pin PWM, and enter the test mode. In the test mode, the selection circuit 144 may be configured to selectively generate the first signal path between the amplifier circuit 122 and the PWM pin PWM, thereby outputting the amplified Hall signal as the test signal.

On the other hand, the driving circuit is coupled between the Hall signal processing unit 12 and the full bridge circuit 16 for receiving the output signal, and stores a pulse width modulation table. The driving circuit 140 is further configured to control phase switching of the full bridge circuit 16 according to the output signal and the pulse width modulation table.

It should be noted that the PWM signal, the test-starting signal and the test signal are different in phase, timing or duty cycle, so as to ensure that the selection circuit 144 may distinguish the difference between the normal mode and the test mode, and also to ensure that the test signal is correctly outputted, such that the Hall signal of the Hall sensor 10 may then be analyzed.

In general, the driving processing circuit 14 can receive the test-starting signal via the PWM pin PWM and enter the test mode. In the test mode, the driving processing circuit 14 may use the PWM pin PWM as the test-starting signal pin and the test signal output pin, and output the output signal of the Hall signal amplified by the amplifier circuit 120 as the test signal. In the normal mode, the PWM pin PWM may be used for normal operation. For example, in the normal operation, the driving processing circuit 14 may drive the motor according to the output signal of the Hall signal processing unit and the PWM signal input from the PWM pin PWM.

Therefore, with the above configuration, the operation status of the Hall sensor may be tested with the limited number of pins, thereby ensuring that the motors manufactured in mass production run smoothly, and saving package costs by implementing the motor driving circuit with the existing pins.

Third Embodiment

Figure 3:
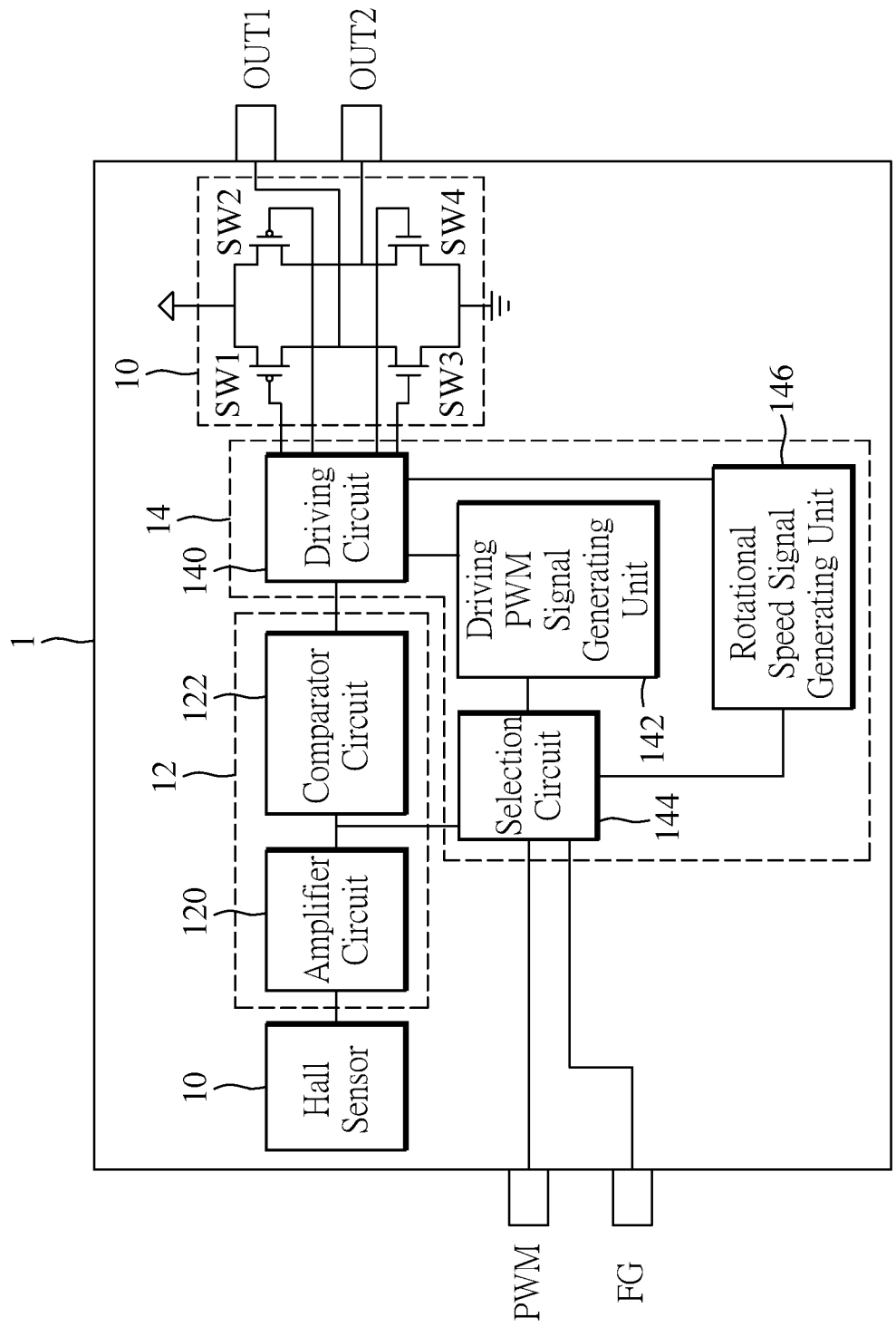
FIG. 3 is a circuit schematic diagram of a motor driving circuit of a third embodiment of the present disclosure.

Reference is now made to FIG. 3, which is a circuit schematic diagram of a motor driving circuit of a third embodiment of the present disclosure. As shown, a third embodiment of the present disclosure provides a motor driving circuit 1 for driving a motor, including a Hall sensor 10, a Hall signal processing unit 12, and a driving processing circuit 14. In the present embodiment, like elements are denoted by like reference numerals, and thus repeated descriptions are omitted.

In continuance of the motor driving circuit 1 provided in the second embodiment, the driving processing circuit 14 may further include a rotational speed signal generating unit 146 coupled to the selection circuit 144 and the drive circuit 140. Specifically, the rotational speed signal generating unit 146 is configured to generate an effective rotational speed signal each time the rotor rotates a specific electrical angle, and output the rotational speed signal to the rotational speed signal output pin FG through the selection circuit 144.

In the normal mode, the driving PWM signal generating unit 142 receives the PWM signal from the PWM pin PWM through the selection circuit 144, and generates the driving PWM signal according to the PWM signal. After the driving circuit 140 receives the output signal and the driving PWM signal, the motor may be driven according to output signal generated by the comparator circuit 122 and the driving PWM signal. In the meantime, the rotational speed signal generating unit 146 outputs the rotational speed signal from the rotational speed signal output pin FG through the selection circuit 144.

On the other hand, the selection circuit 144 may receive the test-starting signal from the PWM pin PWM, and enter the test mode. The selection circuit 144 may be configured to selectively generate a second signal path between the amplifier circuit 120 and the rotational speed signal output pin FG to output the amplified Hall signal as the test signal.

It should be noted that the PWM signal and the test-starting signal are different in phase, timing or duty cycle, so as to ensure that the selection circuit 144 may distinguish the difference between the normal mode and the test mode. Since the test signal is output via a different pin, i.e., the rotational speed signal output pin FG, the PWM signal and the test-starting signal would not be interfered by the test signal.

In general, the driving processing circuit 14 can receive the test-starting signal via the PWM pin PWM and enter the test mode. In the test mode, the driving processing circuit 14 may use the PWM pin PWM as the test-starting signal pin mentioned above, and use the rotational speed signal output pin FG as the test signal output pin to output the Hall signal amplified by the amplifier circuit 120 as the test signal. In the normal mode, the PWM pin PWM and the rotational speed signal output pin FG may be used for normal operation. For example, in the normal operation, the driving processing circuit 14 may drive the motor according to the output signal of the Hall signal processing unit and the PWM signal input from the PWM pin PWM. Meanwhile, the rotational speed signal generating unit 146 outputs the rotational speed signal from the rotational speed output pin FG via the selection circuit 144.

Therefore, with the above configuration, the operation status of the Hall sensor may be tested with the limited number of pins, thereby ensuring that the motors manufactured in mass production run smoothly, and saving package costs by implementing the motor driving circuit with the existing pins.

Fourth Embodiment

Figure 4:
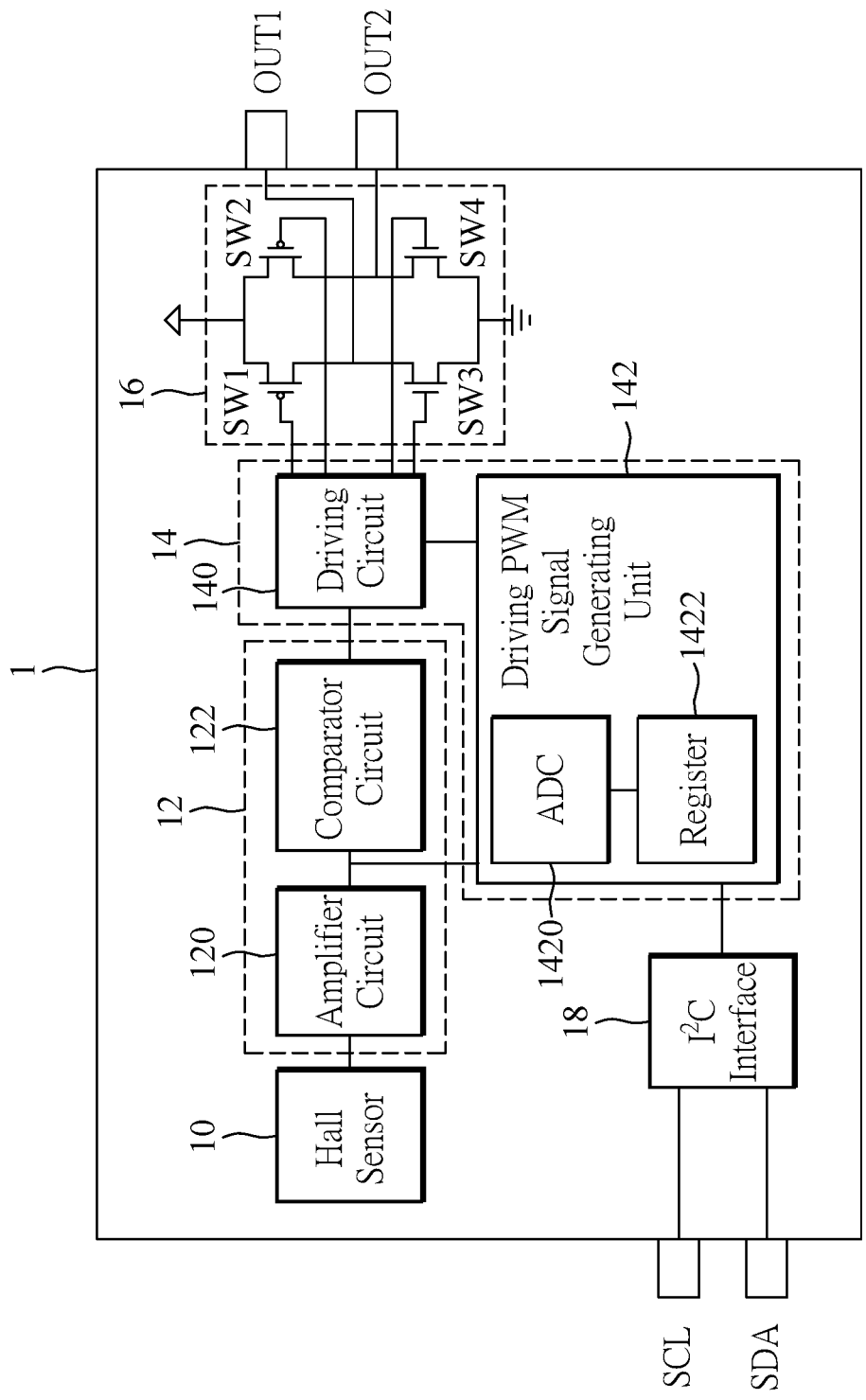
FIG. 4 is a circuit schematic diagram of a motor driving circuit of a fourth embodiment of the present disclosure.

FIG. 4 is a circuit schematic diagram of a motor driving circuit of a third embodiment of the present disclosure. Reference is now made to FIG. 3, as shown, a fourth embodiment of the present disclosure provides a motor driving circuit 1 for driving a motor, including a Hall sensor 10, a Hall signal processing unit 12, and a driving processing circuit 14. In the present embodiment, like elements are denoted by like reference numerals, and thus repeated descriptions are omitted.

The difference from the foregoing embodiment is that the driving processing circuit 14 further includes the driving circuit 140 and the driving PWM signal generating portion 142. The driving PWM signal generating unit 142 is coupled to the driving circuit 140, the amplifier circuit 120 and I²C interface 18.

Inter-Integrated circuit (I²C) is a serial communication bus that may be utilized in various control architectures such as System Management Bus (SMBus), Power Management Bus (PMBus), Intelligent Platform Management Interface (IPMI), Display Data Channel (DDC), and Advanced Telecom Computing Architecture (ATCA).

In the normal mode, the driving PWM signal generating unit 142 receives a PWM signal from a serial clock line (SCL) through the I²C interface 18, and generates the driving PWM signal according to the PWM signal. The driving circuit 140 may receive an output signal output by the amplifier circuit 122 and the driving PWM signal to drive the motor accordingly.

On the other hand, the driving PWM signal generating unit 142 enters a test mode when receiving the test-starting signal by the serial clock signal pin SCL, and the driving PWM signal generating unit is configured to output the test signal from the serial data line (SDA) pin SDA among the plurality of pins via the I²C interface according to the received Hall signal.

In more detail, the driving PWM signal generating unit 142 further includes an analog-digital converter (ADC) 1420 and a register 1422. The ADC 1420 may be configured to receive the amplified Hall signal and generate a digital signal to be written into the register 1422. Therefore, in the test mode, the driving PWM signal generating unit 142 may be configured to output data in the register 1422 as the test signal from the serial data signal pin SDA via the I²C interface 18.

However, the above-mentioned examples are only one of the possible embodiments and are not intended to limit the invention. The motor drive circuit of the present disclosure can also enable the test mode by inputting the test-starting signal through one existing pin of another conventional motor drive circuit, and provide a signal path for the amplified Hall signal to be output as the test signal.

Therefore, with the above configuration, the operation status of the Hall sensor may be tested with the limited number of pins, thereby ensuring that the motors manufactured in mass production run smoothly, and saving package costs by implementing the motor driving circuit with the existing pins.

One of the advantages of the present disclosure is that the motor driving circuit provided by the present disclosure may test the operation status of the Hall sensor with the limited number of pins through the technical features of "a test-starting pin for receiving a test-starting signal and a test signal output pin for outputting a test signal are shared with at least one of the plurality of pins", thereby ensuring that the motors manufactured in mass production run smoothly, and saving package costs by implementing the motor driving circuit with the existing pins.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A motor driving circuit for driving a motor, comprising:
a plurality of pins including a pulse width modulation (PWM) pin and a speed signal output pin, wherein the PWM pin is used as a test-starting pin for receiving a test-starting signal, and the PWM pin or the speed signal output pin is used as a test signal output pin for outputting a test signal;
a Hall sensor configured to sense a change in a magnetic field of the motor to generate a Hall signal accordingly;
a Hall signal processing unit coupled to the Hall sensor; and
a driving processing circuit configured to drive the motor according to an output signal of the Hall signal processing unit and a control signal input by one of the plurality of pins,
wherein the Hall signal processing unit includes an amplifier circuit for amplifying the Hall signal and a comparator circuit for comparing the Hall signal to generate the output signal;
wherein the driving processing circuit is configured to enter a test mode when receiving the test-starting signal, and output an output signal of the Hall signal processing unit to the test signal output pin as the test signal;
wherein in a normal mode, the PWM pin and the speed signal output pin are used for normal operation;
wherein the driving processing circuit includes:
a first driving circuit;
a driving PWM signal generating unit connected to the first driving circuit;

a selection circuit coupled to the driving PWM signal generating unit, the amplifier circuit, the PWM pin and the speed signal output pin; and a rotational speed signal generating unit coupled to the selection circuit and the first driving circuit, wherein in the normal mode, the PWM driving signal generating unit receives a PWM signal from the PWM pin through the selection circuit, and the first driving circuit is configured to receive the output signal and the driving PWM signal, and to drive the motor according to the output signal and the driving PWM signal, and wherein the selection circuit enters the test mode when the test-starting signal is received by the PWM pin, and in the test mode, the selection circuit is configured to selectively generate a first signal path between the amplifier circuit and the PWM pin to output the amplified Hall signal as the test signal, or the selection circuit is configured to selectively generate a second signal path between the amplifier circuit and the speed signal output pin to output the amplified Hall signal as the test signal.

2. The motor driving circuit according to claim 1, wherein in the normal mode, the speed signal generating unit outputs a speed signal from a speed signal output pin of the plurality of pins through the selection circuit.

3. The motor driving circuit according to claim 1, wherein the driving processing circuit further includes a full bridge circuit, the first driving circuit being coupled between the Hall signal processing unit and the full bridge circuit for receiving the output signal, and storing a pulse width modulation table, the first driving circuit being configured to control phase switching of the full bridge circuit according to the output signal and the pulse width modulation table.

* * * * *